Feb. 1, 1927.

G. S. COLEMAN 1,616,304

MOVING PICTURE BASEBALL SCOREBOARD

Filed Dec. 1, 1924   2 Sheets-Sheet 1

INVENTOR
George S. Coleman
BY
*[signature]*
ATTORNEY

Feb. 1, 1927.
G. S. COLEMAN
1,616,304
MOVING PICTURE BASEBALL SCOREBOARD
Filed Dec. 1, 1924    2 Sheets-Sheet 2
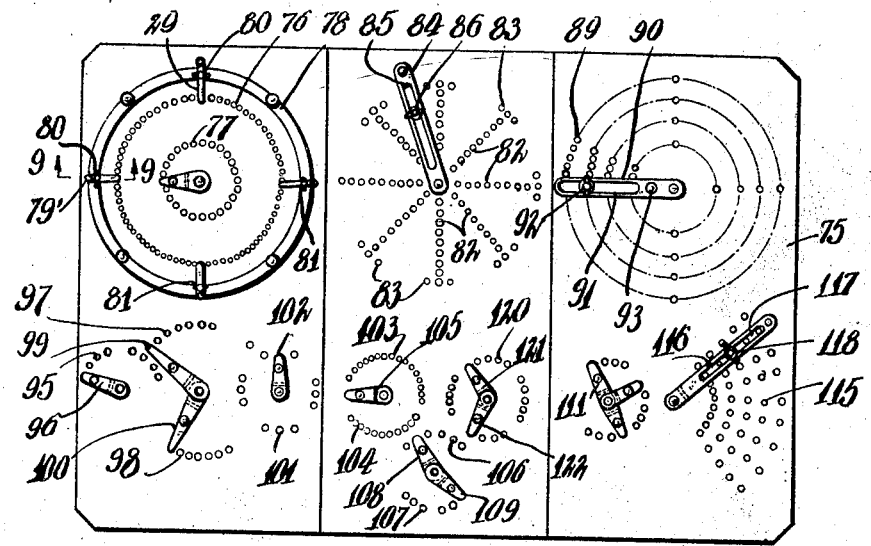
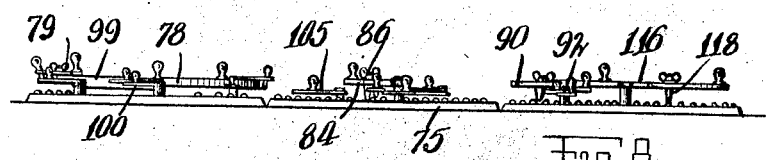
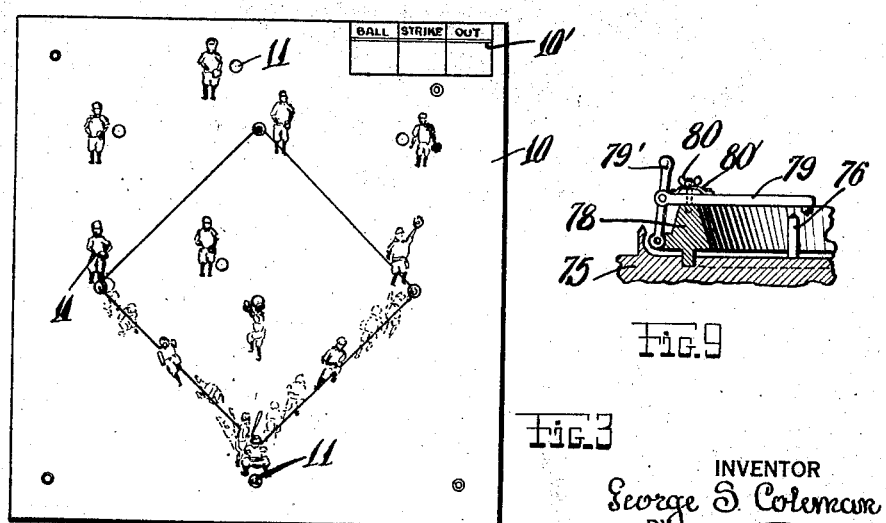
INVENTOR
George S. Coleman
BY
ATTORNEY Patented Feb. 1, 1927.

1,616,304

UNITED STATES PATENT OFFICE.

GEORGE S. COLEMAN, OF NEW YORK, N. Y.

MOVING-PICTURE-BASEBALL SCOREBOARD.

Application filed December 1, 1924. Serial No. 753,071.

This invention relates to an apparatus for reproducing baseball games, by means of which the various plays made in an actual game may be shown as they occur.

The present invention is a further development of one shown and described in a previous patent issued to me on Sept. 9, 1924, Patent No. 1,507,583 and it has for its object to provide a novel form of multiple projection apparatus whereby pictures representing the players executing the plays, or executing any acts incidental to the playing of the game, or the actions of others such as umpires or coaches, may be shown on a board, screen, or other surface marked off to represent a base ball field.

For further comprehension of the invention, and of the objects and advantages thereof, reference will be had to the following description and accompanying drawing, and to the appended claims in which the various novel features of the invention are more particularly set forth.

Fig. 1 of the drawings is a diagrammatic side view of the complete apparatus.

Fig. 5 is a like view to Fig. 4 but showing a modification.

Fig. 7 is a face view of the switchboard for controlling the lamps.

Fig. 8 is a bottom edge view thereof.

Fig. 9 is an enlarged fragmentary horizontal sectional view taken on the line 9—9 of Fig. 7.

In the invention as here embodied I show, briefly, a board or "screen" marked to represent the playing field or "diamond" and on which the pictures or representations are projected; a projector frame supporting a multiplicity of projection devices for showing the movements of those taking part in the game, and a switchboard for controlling the illuminations of the projector lamps. For projecting a representation of the moving ball upon the screen I propose to employ the projector shown and described in my previous patent above referred to.

Figure 1:
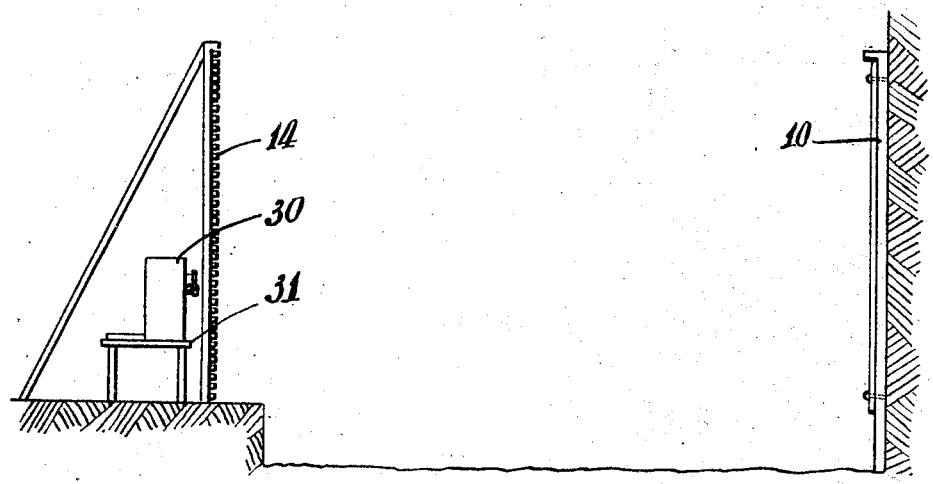
Figure 2:
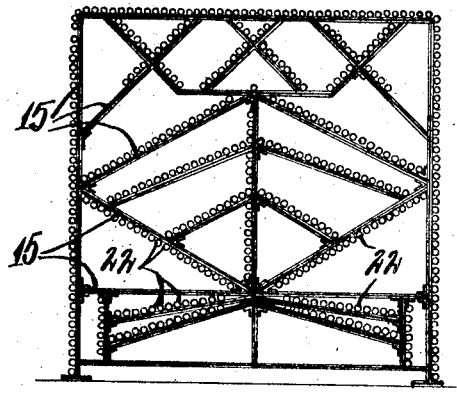
Fig. 2 is a face view showing the arrangement of the projectors on their supporting frames.
Figure 3:
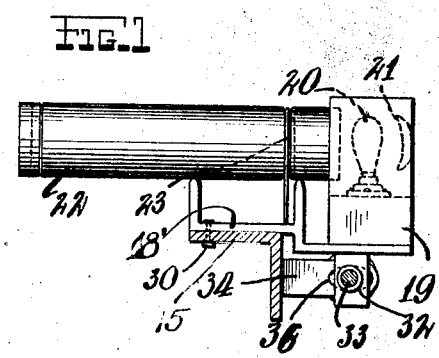
Fig. 3 is a face view of the board representing the playing field on which the pictures are projected, this view also indicating the projection of certain plays of the game upon the board.

The board representing the playing field is shown at 10 in Figs. 1 and 3 and may be of rectangular shape, the positions of the various players taking part in the game being indicated by the marks 11. The projection frame is indicated generally at 14 in Fig. 1 and may be made up of a number of suitably arranged angle bars 15 forming supports for the projection devices. The board 10 and the frame 14 are arranged in vertical position facing one another, as shown in Fig. 1, being supported in any suitable manner. The angle bars 15 of the frame 14 are preferably arranged in the manner indicated in Fig. 2, extending, generally speaking, along lines approximating the paths traveled by the players during the game, such as in walking to and from the bench, or "dugout," and the home plate; traveling around the bases; or fielding batted balls.

These bars support a multiplicity of projectors which are arranged to direct individual pictures upon the proper parts of the board, the pictures being shown in such sequence as may be desired to give an actual life-like representation of the players in movement. For instance a man running the bases can be shown by means of a series of pictures directed in succession along the base lines and showing in proper sequence the different positions of the limbs assumed in running. In the same way a player can be shown chasing or fielding a batted ball. Likewise, by directing a succession of pictures on the one spot, a man can be shown in the act of pitching, umpiring, or coaching, or catching the ball, it being possible to show in complete detail the actions of all those taking part in the game, the above noted instances being given for purposes of illustration.

Figure 4:
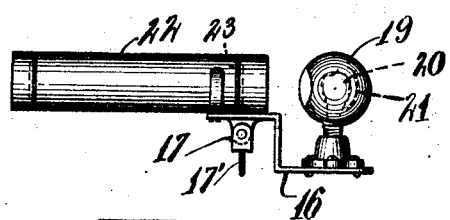
Fig. 4 is a detail side view of one of the projectors showing its support in transverse section.

The projectors are adapted to be mounted in closely spaced relation along the bars 15. One form of these projection devices is illustrated in detail in Figs. 4 and 5 and comprises a base or bracket 16 that is hinged on a second bracket 17, this latter having a stem 17' extending downwardly through the bar 15 whereby the bracket is mounted on said bar for rotary adjustment. The bracket 16 is formed with a rearwardly projecting foot adapted to support a lamphouse 19 in which is a lamp 20 having behind it the usual reflector 21. Located in front of the lamp is a projector element comprising a tubular member 22 containing front and rear lenses and a picture plate 23. Since the manner of constructing these devices is well known a detail illustration thereof is not deemed necessary. The member 22 rests upon the bracket 16 the latter having upwardly projecting spring clips 25, curved to fit the circular surface of the member.

Figure 6:
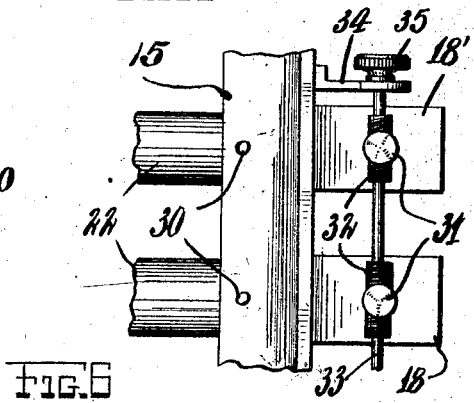
Fig. 6 is an underside plan view of the device illustrated in Fig. 5.

I may, in certain parts of the device, employ the projector mounting shown in detail in Figs. 5 and 6 and which is arranged so as to permit of a number of contiguous projector members to be directed on the one spot or on adjacent spots. As here shown the brackets 18' corresponding to the brackets 18, are pivoted at their front ends as at 20 on the bar 15, while their rear ends have pivotally mounted therein and depending therefrom the studs 31. These studs are formed with transverse apertures therein, the respective apertures of the series of studs being screwthreaded with threads of different pitch. These apertures have threaded therethrough the sleeves 32 fixed on a common rod 33 that is mounted for rotation in brackets 34 on the bar 15 and is provided with a head 36 for rotation, the brackets 34 having slotted apertures such as 32 therein through which the rod passes to permit of the bodily movement of the rod transversely of itself. It will be apparent that by rotating the rod 33 the series of projector devices with which it is connected may be directed upon a common spot or upon adjacent spots on the board 10.

The means for controlling the lamps 20 which serve the projectors on frame 14 is illustrated particularly in Figs. 10, 11 and 12. This means comprises a panel board 75 which may be divided into three sections and provided with suitable switches controlling different sets of the lamps 20.

The upper portion of the panel board has three main series of control switches for indicating respectively the movement of the men on bases, and the infield and outfield of the opposing team. The first of these comprises two concentric circular rows of switch points, indicated respectively at 76 and 77 mounted on said board. Adjacent the outer row 76 a switch ring 78 is rotatably mounted and carries a series of four evenly spaced contact arms 79 which are adapted to project over the points 76. These arms are preferably adjustable radially on the ring 78 so as to be moved into and out of engagement with the points 76, the arms being here shown as secured to the ring by means of wingheaded screws 80 threaded into the ring 78 and passing through slots 82 in the arms 79. A suitable frictional hold is maintained on the arms 79 by means of bow springs such as 80' fixed to the arms 79, these springs being apertured to receive the screws 80. The arms 79 are adjusted by means of levers 79' hinged to the rings 78 and having the outer ends of the arms connected thereto. The projectors controlled by the switch points 76 and arms 79 are directed upon the base lines of the diamond on board 10 so that the movement around the bases of the players of the team at bat may be shown by proper manipulation of the ring 78. If one man is to be shown traveling on the bases only one of the arms 79 is left in engagement with the switch points 76, the number of arms in engagement with the switch points corresponding to the number of men on bases, while the positions of the arms in use will be made to correspond with the positions of the men on bases.

The second of these main series comprises a number of radially arranged rows of switch points 82 at the ends of which are circumferentially offset points 83. These are controlled by a radial arm 84 slotted as at 85 to receive a longitudinally adjustable contact indicated generally at 86. The third of these comprises four concentric rows of switch points 89 one for each infield player, controlled by a switch arm 90 slotted as at 91 to adjustably hold a contact indicated generally at 92 this arm being hinged as at 93 to permit of its being lifted from contact with the switch points 89.

In addition to the above main series of switches I provide a series of switch points 95 controlled by a hinged switch arm 96, the lamps in this circuit controlling projectors indicating the movements of the batters, either right or left hand. I provide also two rows of switch points 97 and 98 controlled by hinged switch arms 99 and 100 adapted for operation when the movements of the catcher are to be shown, the upper row being used to indicate movements of the catcher in receiving or throwing a ball, and the lower row to show when the catcher walks up to consult with the pitcher. Also a series of switch points 101 controlled by a hinged arm 102 for showing the movements made by the umpires in declaring strikes or balls, the same arm being used to control a series of nine switch points 102' connected with projectors signaling which man is at bat. Also two rows of switch points 103 and 104 controlled by a single arm 105 are used in connection with showing the movement of the batter from the dugout to the plate and back again. Projectors are also provided to show the movement of the coaches at first and third base, being controlled by the rows of switch points 106 and 107, and hinged switch arms 108 and 109. I also provide three series of switch points 110, controlled individually by arms 111 to show the number of strikes or balls served to a batter and the number of men out. These signals together with the names and playing positions of the men at bat may be thrown in a marked off space 10' on the board 10. Projectors showing the movements of the pitcher are controlled by the concentric arcuate rows of switch points 115 engaged by a hinged contact arm 116 slotted as at 117 to receive an adjustable contact member 118.

It is not considered essential that a detailed description of the manner of use of my improved apparatus in the playing of a game be driven. It will be apparent that by moving shaft 35 the spot of light representing the ball can be caused to move as desired on the board 10, while by proper manipulation of the various switch arms pictures showing the actions of the players can be thrown in proper sequence on the desired parts of said board.

I also provide a circularly arranged row of switch points 120, divided into four series and controlled by the switch arms 121 and 122 to indicate when a new pitcher is warming up and when a pitcher is taken out and the new one sent in.

Having thus described my invention, what I claim as new and desire to protect by Letters Patent of the United States is as follows:

1. In an apparatus of the type described, a series of projector elements, a bar on which said projector elements are supported side by side, said projector elements being pivoted at one end to said bar to swing laterally thereon, and a rotatable rod having a series of threaded elements thereon of different pitch engaged with the individual projectors to vary their relative lines of projection.

2. In an apparatus of the type described, a series of projector elements, a bar on which said projector elements are supported side by side, said projector elements being pivoted at one end to said bar to swing laterally thereon, studs pivoted to said projector elements, and a rotatable rod supported by said bar and formed with a series of threaded elements of different pitch engaged with said studs to swing the said projectors by rotation of said rod.

3. In an apparatus for reproducing baseball games, the combination of a board representing the playing field with a projection frame, a plurality of angle bars on said frame arranged along lines representing approximately the paths traveled by the players during the game, a series of projector elements, brackets mounted on said angle bars on which said projector elements are supported side by side, said projector elements being pivoted at one end to said brackets to swing laterally thereon, and a rotatable rod having a series of threaded elements thereon of different pitch engaged with the individual projectors to vary their relative lines of projection.

4. In an apparatus for reproducing baseball games, the combination of a board representing the playing field with a projection frame, a plurality of angle bars on said frame arranged along lines representing approximately the paths traveled by the players during the game, with means supported by said angle bars for projecting spot lights on said board to represent thereon the movements of the ball and the actions of the players, and means connecting said projecting means together for adjusting a series of the latter in unison.

5. In an apparatus for reproducing baseball games, the combination with a board representing the playing field, of a projector frame, a plurality of angle bars on said frame arranged along lines representing approximately the paths traveled by the players during the game, a series of projector elements adapted to project a series of spot lights along lines determined by said angle bars, brackets mounted on said angle bars on which said projector elements are pivoted side by side, said projector elements being pivoted at one end of said brackets to swing laterally thereon, studs pivoted to said projector elements and a rotatable rod supported by said brackets and formed with a series of threaded elements of different pitch engaged with said studs to swing the said projector elements by rotation of said rotatable rod.

In testimony whereof I have affixed my signature.

GEORGE S. COLEMAN.